United States Patent [19]

Hansen

[11] Patent Number: 5,132,972
[45] Date of Patent: Jul. 21, 1992

[54] ASSEMBLY LANGUAGE PROGRAMMING POTENTIAL ERROR DETECTION SCHEME SENSING APPARENT INCONSISTENCY WITH A PREVIOUS OPERATION

[75] Inventor: Robert G. Hansen, Phoenix, Ariz.

[73] Assignee: Honeywell Bull Inc., Billerica, Mass.

[21] Appl. No.: 443,680

[22] Filed: Nov. 29, 1989

[51] Int. Cl.[5] .............................................. G06F 11/00
[52] U.S. Cl. ......................................... 37/19; 371/23
[58] Field of Search ................................... 371/19, 23

[56] References Cited

PUBLICATIONS

Botton, D., "Microcode Checking", *IBM Technical Disclosure Bulletin*, vol. 19, No. 10, Mar. 1977, pp. 3915-3917.
Sheraga, R. et al., "Experiments in Automatic Microcode Generation", *IEEE Trans. on Computers*, vol. C-32, No. 6, Jun. 1983, pp. 557-569.
Abbott, C., "A Symbolic Simulator for Microprogram Development", *IEEE Trans. on Computers*, vol. C-32, No. 8, Aug. 1983, pp. 770-774.
Wright, M., "μP Simulators Let You Debug Software on an IBM PC", *EDN*, Dec. 11, 1986, pp. 196-204.
Brumm, P. et al. *80386-A Programming and Design Handbook*, copyright 1987 by TAB Books Inc., pp. 28-42.

*Primary Examiner*—Stephen M. Baker
*Attorney, Agent, or Firm*—J. S. Solakian; J. H. Phillips

[57] ABSTRACT

A computer aided software engineering tool is disclosed which is particularly well adapted to identify potential Assembly language source code errors resulting from the analysis of statements which do not contain incorrect syntax, limits, operand specification, etc.; i.e., do not contain any errors of the type which can be generally categorized as incorrect usage. This objective is achieved by providing a debugging program which has a complete awareness of the specific machine architecture, such as the function of each instruction and the register(s), flags, etc. it affects. By essentially stepping through the Assembly language statements in much the same manner as a computer would while executing the corresponding instructions, the debugging program is able, through such simulation, to identify, in the Assembly language program under study, specific potential inconsistencies with previous operations which the debugging program has been coded to detect and, upon such detection, to issue an appropriate warning message. The programmer may then examine the flagged Assembly language code to determine if a genuine error exists.

4 Claims, 2 Drawing Sheets

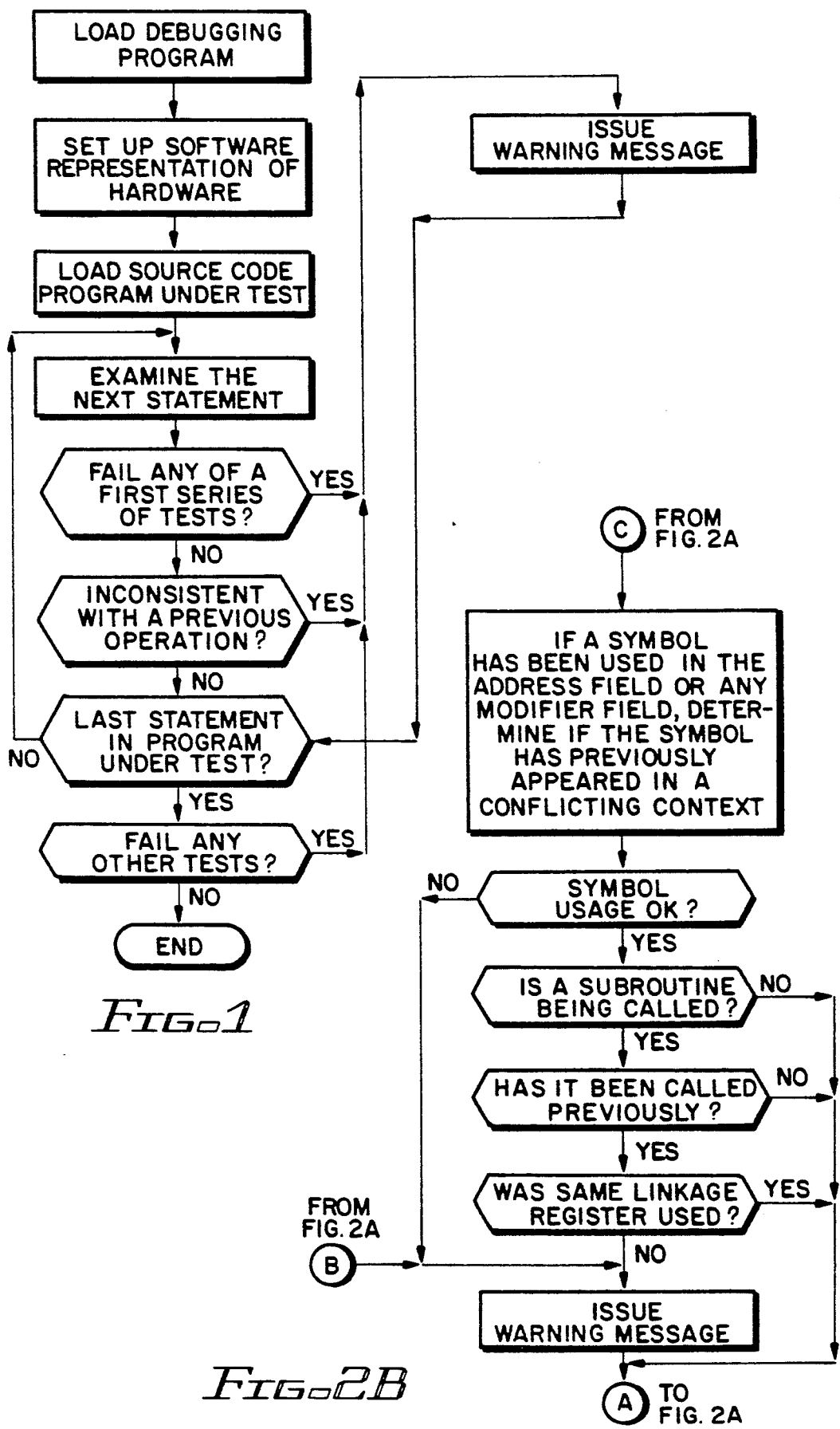

ASSEMBLY LANGUAGE PROGRAMMING POTENTIAL ERROR DETECTION SCHEME SENSING APPARENT INCONSISTENCY WITH A PREVIOUS OPERATION

REFERENCE TO MICROFICHE APPENDIX

For a complete listing (in C) of the computer program constituting the present invention, one may refer to the Microfiche Appendix filed concurrently herewith and incorporated by reference herein, which Microfiche Appendix includes one (1) Microfiche plate containing ninety-five (95) total frames including the test pattern.

FIELD OF THE INVENTION

This invention relates to the art of computer programming and, more particularly, to an Assembly language debugging software engineering tool particularly adapted to detect logical or contextual inconsistencies in statements which are syntactically valid; i.e., in statements which do not contain any errors of the type which can be generally categorized as incorrect usage.

BACKGROUND OF THE INVENTION

As those skilled in the art well understand, computer programming is rarely performed directly in machine language. Instead, programming is usually carried out in higher language form such as C, BASIC, FORTRAN, COBOL, PASCAL, etc. In the case of BASIC, a resultant "source" program can then be executed employing a machine resident interpreter program which reads the individual source code programming statements and converts them to machine instructions (appropriate for the hardware being used) on a statement by statement basis. This is a relatively slow process, however, and more efficient and very much faster execution of a BASIC program can be obtained by first processing it through a compiler program specifically created to prepare executable or "object" code in an optimum sequence for a given type of hardware. Compilation is routinely carried out (in fact, is required) even during the programming and program proving tasks for many of the high level programs such as C.

Some programmers prefer to work in a less high level, more machine specific, language designated "Assembly" which is readily reduced to machine level instructions with an "Assembler" program in an operation similar to, but much more straightforward than, compilation. The resultant object code is very efficient. However, because Assembly is a low level language, it is notoriously easy, during the coding process, to introduce subtle programming errors (or "bugs") which the Assembler will not catch and which may be particularly elusive to identify and remedy during the program proof (or "debugging") process.

One class of errors of this elusive sort are those in which an Assembly language statement is entirely legal in that syntax, limits, specification of operands, etc. are all properly incorporated, but the correctly configured statement is nonetheless apparently logically inconsistent with a previous operation. It is to the early detection of elusive programming errors of this class that the present invention is directed.

OBJECTS OF THE INVENTION

It is therefore a broad object of this invention to provide an improved debugging tool for analyzing the source of computer programs written in Assembly language.

It is a more specific object of this invention to provide a debugging program which is capable of identifying, in Assembly language source code, elusive programming errors of a type in which statements are correct if considered by themselves, but are illogical in the context of previous operations.

SUMMARY OF THE INVENTION

Briefly, these and other objects of the invention are achieved by providing a debugging program which has a complete awareness of the specific machine architecture, such as the function of each instruction and the register(s), flags, etc. it affects. By essentially stepping through the Assembly language statements in much the same manner as a computer would while executing the corresponding instructions, the debugging program is able, through such examination, to identify, in the Assembly language program under study, specific potential inconsistencies with previous operations which the debugging program has been coded to detect and, upon such detection, to issue an appropriate warning message. The programmer may then examine the flagged Assembly language code to determine if a genuine error exists.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 is a high level flow chart illustrating the general sequence of a debugging program in which the present invention may be incorporated.

DETAILED DESCRIPTION OF THE INVENTION

Figure 2A:
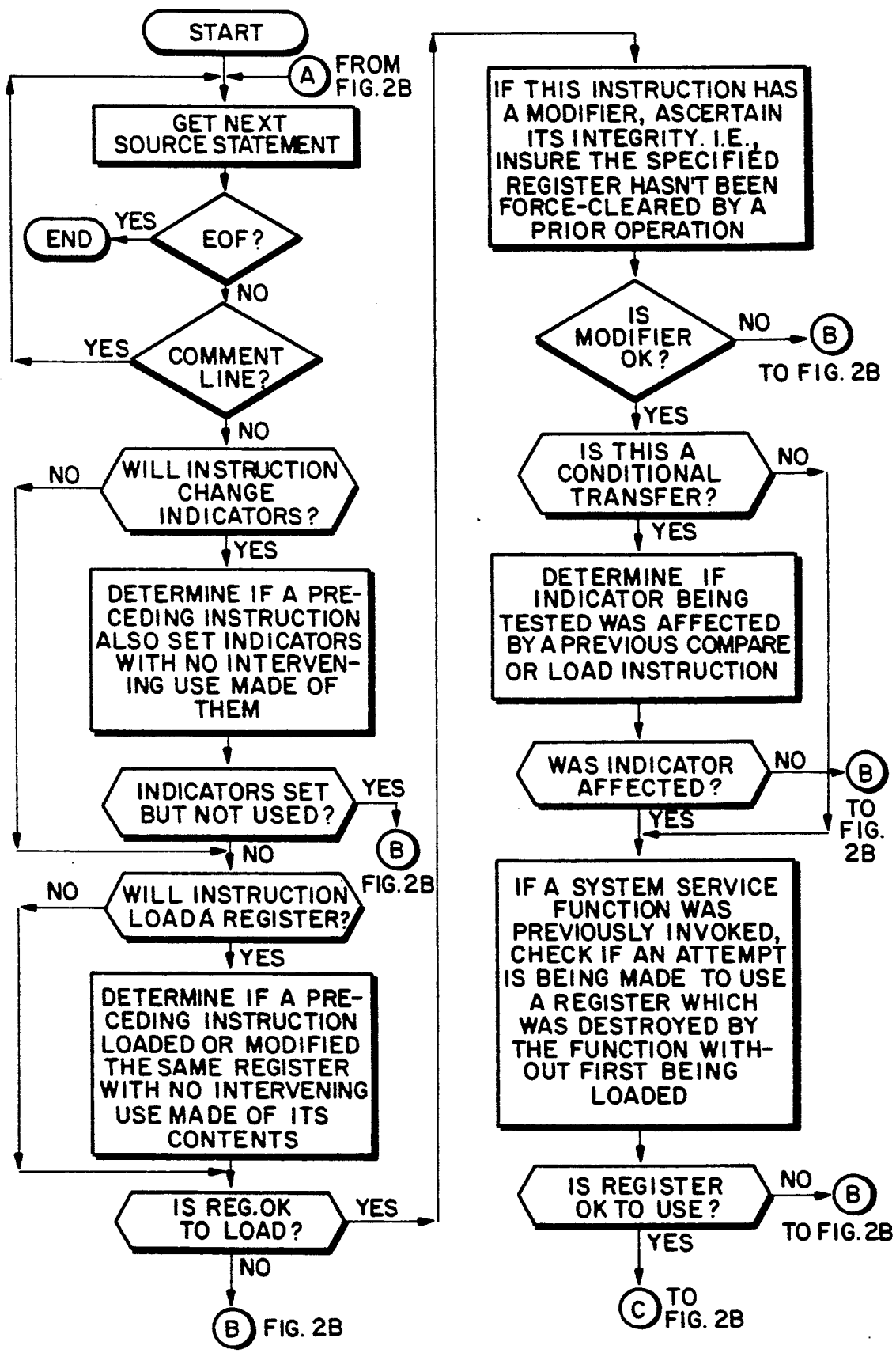
FIG. 2, constituting FIG. 2A and FIG. 2B taken together, is a more detailed flow chart disclosing the structure of the debugging module in which the present invention is incorporated.

As previously discussed, one class of particularly difficult to find program bugs encountered are those in which an Assembly language source code statement is entirely correct insofar as syntax, limits, specification of operands, etc. are concerned, but the correctly configured statement is nonetheless logically inconsistent with a previous operation. Such inconsistencies may include the following:

1. The indicators set by a preceding compare instruction were not tested or stored, and the current instruction will now cause these indicators to be changed;
2. The current instruction will load (and thus destroy) a register which was previously modified, but which was never stored or used as a modifier.
3. The upper or lower half of a register has been force-cleared by some prior operation; however, this half register is now being used either as an operand or as a modifier. Force-clearing may be the result of a shift, load or "AND" operation.
4. A conditional transfer is being attempted based upon an indicator which was not affected by a previous operation.

5. A register whose contents are known to be destroyed by a system service function is now being called upon for use as a modifier without being reloaded after invoking the function.
6. A symbol which previously appeared in the context of a certain type of address modification is now being called upon for use in a different type of context.
7. A subroutine which has previously been observed to use a given index register for linkage is now being called using a different index register.

Attention is first directed to FIG. 1 which is a high level flow chart illustrating the general sequence of a debugging program of the present class. As a first step in setting up the debugging, certain essential aspects of the architecture of the machine for which object code is to be generated is represented in software in a manner well known to those skilled in the art. Briefly, merely as an elementary example, consider a case in which a certain address is developed (in the machine for which object code is to be generated) by combining information from two sources. The fact of that characteristic is encoded into the debugging program along with code for tracking what would happen to the information sources and to the address as the Assembly language statements are examined one at a time. Now, if one of the sources can be determined to have been destroyed by a previous operation and never reloaded with meaningful information prior to its use in developing an address, something is probably wrong notwithstanding completely correct syntax, etc. of all the relevant source code.

For an example of the manner in which the relevant architectural characteristics of hardware employing the GCOS 8 operating system may be represented, one may refer to pages 2–54 of the aforementioned Microfiche Appendix.

Various tests can be conducted on a step by step basis as an Assembly language source code program under test is examined and analyzed, and failure of any of the tests can result in the issuance of an appropriate error message for the benefit of the programmer. The present invention, however, relates to a series of related tests, directed to the above-enumerated logical inconsistencies, in a stand alone module of the debugging program and is represented in FIG. 1 by the inquiry block: "INCONSISTENT WITH A PREVIOUS OPERATION?". Following completion of the subject battery of tests, any other tests remaining in the debugging program may be run to conclude the testing of the source code program or program module.

Attention is now directed to FIG. 2 (i.e., FIGS. 2A and 2B taken together) which is a detailed flow chart disclosing the operation of the subject Assembly language source code test module in which inconsistency of a given statement with a prior operation called for by the source code program or program module under test is examined, notwithstanding its otherwise correct attributes. In the following discussion, the use of Assembly language source code is assumed such that a statement is very closely related to a single machine language instruction.

Thus, starting from the beginning of the source code program or program module under examination, the next statement is called for analysis. If it is an end-of-file statement, an exit is made to the next series of tests; if not, a determination is made as to whether it is a mere comment (which need not be analyzed). If it is a comment, the next statement is called; if not, the analysis proceeds on the merits.

The first inquiry is whether an instruction will change an indicator or flag. If so, a determination is made as to whether a preceding instruction also set indicators and, if so, whether any intervening use was made of the indicator states. If a preceding instruction set indicators, but no intervening use was made of them, and now the indicators are again being set, a logical inconsistency may be present, and a specific error message to that effect is issued to alert the programmer to the potential problem. If the statement under examination does not involve setting indicators, or if it does, but a previous indicator setting was, in fact, legitimately used, then the next test in the module may be undertaken.

Next, an inquiry is made to determine if the statement will cause a given register to be loaded or modified. If so, a determination is made as to whether a preceding instruction also loaded or modified the same register and, if so, whether any intervening use was made of the register contents. If a preceding instruction loaded or modified the register, but no intervening use was made of its contents, and now the register is again being loaded or modified, a logical inconsistency may be present, and a specific warning message to that effect is issued to alert the programmer to the potential problem. If the statement under examination does not involve loading or modifying a register, or if it does, but the register contents were, in fact, legitimately used, then the next test in the module may be undertaken.

Next, if the statement under investigation uses a direct operand or modifier which constitutes a half-register, a determination is made as to the validity of its use. For example, if a prior operation resulted in force clearing the specified half-register, then it probably was the programmer's intention to use the other register-half, and an appropriate warning message is issued. Force clearing may be the result of a shift, direct operand load or logical AND operation.

Next, the statement under test is examined to determine if it calls for a conditional transfer. If not, the next test in the suite is performed. If so, a determination is made as to whether the indicator being tested was affected by a previous compare or load instruction. If the indicator was not affected, it is likely that an incorrect test is being performed, and an appropriate warning message is issued.

A determination is now made as to whether or not a system service function was previously invoked which destroyed the contents of a register which is now being called upon to be used as a modifier or operand without being reloaded after invoking the system service function. If so, the contents of the register are invalid for the request, the usage of the register is incorrect and a warning message is issued.

Next, a determination is made as to whether or not a symbol has been used in the address field or any modifier field and, if so, whether the symbol has previously appeared in a conflicting context. If the symbol usage is inappropriate, a warning message is generated.

If the symbol usage is appropriate, a determination is made as to whether a subroutine is being called. If not, the statement under examination can be considered not inconsistent with a previous operation, and the next statement can be taken up for analysis. However, if a subroutine is being called, further analysis is necessary. If the subroutine was not called previously, the statement under examination can now be considered not inconsistent with a previous operation, and the next statement can be taken up for analysis. But, if the subroutine was called previously, it is necessary to determine if the same linkage register was used; if so, the next statement may be called, but, if not, a warning message is issued.

According to the embodiment of the subject invention shown in FIG. 2, in each case of the issuance of a warning message, the debugging program continues right on through the entire Assembly language source code program or program module under examination, the next statement can be called up for analysis as indicated in FIG. 2. Thus, the entire group of warning messages can be reviewed as a group, recognizing that there may be interrelationships among the bugs or possible bugs, for revision of the source code as may be appropriate. Alternatively, those skilled in the art will understand that the debugging program could be readily revised such that its execution can be made to terminate after each warning message is issued such that the "earliest remaining" bug or potential bug of the sort detectable by the subject program can be addressed by the programmer. Experience has shown, however, that the mode of operation shown in FIG. 2 is preferable.

For a detailed specific listing of a debugging program incorporating the subject invention, one may refer to pages 55–94 of the aforementioned Microfiche Appendix.

Thus, while the principles of the invention have now been made clear in an illustrative embodiment, there will be immediately obvious to those skilled in the art many modifications of program structure used in the practice of the invention which are particularly adapted for specific environments and operating requirements without departing from those principles.

What is claimed is:

1. A computer aided software engineering process adapted to identify potential source code errors by the analysis of Assembly language statements which do not contain incorrect syntax, limits, operand specification, etc., including the steps of:
   A) establishing, in the computer system with which the program in development is being debugged, a software representation of the architecture of the computer system upon which the program in development will be eventually used;
   B) loading the first statement of the program in development for analysis;
   C) simulating execution of the machine level instruction of the statement in analysis;
   D) determining if the results of the simulated execution of the instruction are inconsistent with a previous simulated operation by determining if an indicator set by a preceding compare instruction was not tested and was not stored and that the instruction whose execution is being simulated will cause the indicator to be changed; a positive determination invoking step E)1) and a negative determination invoking step E)2);
   E) if the determination made in step D) is that:
      1) the results of step C) are inconsistent with a previous simulated operation, issuing a warning message;
      2) the results of step C) are not inconsistent with a previous simulated operation, going to step F);
   F) loading the next statement of the program in development for analysis; and
   G) returning to step C).

2. The computer aided software engineering process of claim 1 which further includes the step of exiting following performance of step E)1).

3. A computer aided software engineering process adapted to identify potential source code errors by the analysis of Assembly language statements which do not contain incorrect syntax, limits, operand specification, etc., including the steps of:
   A) establishing, in the computer system with which the program in development is being debugged, a software representation of the architecture of the computer system upon which the program in development will be eventually used;
   B) loading the first statement of the program in development for analysis;
   C) simulating execution of the machine level instruction of the statement in analysis;
   D) determining if the results of the simulated execution of the instruction are inconsistent with a previous simulated operation by determining if the instruction whose execution is being simulated will load a register which was previously modified, but never thereafter stored and never thereafter used as a modifier; a positive determination invoking step E)1) and a negative determination invoking step E)2);
   E) if the determination made in step D) is that:
      1) the results of step C) are inconsistent with a previous simulated operation, issuing a warning message;
      2) the results of step C) are not inconsistent with a previous simulated operation, going to step F);
   F) loading the next statement of the program in development for analysis; and
   G) returning to step C).

4. The computer aided software engineering process of claim 3 which further includes the step of exiting following performance of step E)1).

* * * * *